(12) United States Patent
Vampola

(10) Patent No.: US 8,300,276 B2
(45) Date of Patent: Oct. 30, 2012

(54) COMPENSATING FOR MISALIGNMENT IN AN IMAGE SCANNER

(75) Inventor: John L. Vampola, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 525 days.

(21) Appl. No.: 12/636,207

(22) Filed: Dec. 11, 2009

(65) Prior Publication Data

US 2011/0141330 A1   Jun. 16, 2011

(51) Int. Cl.
*H04N 1/00* (2006.01)
(52) U.S. Cl. ........ 358/406; 348/262; 348/295; 348/297; 348/302
(58) Field of Classification Search .................... 358/406
See application file for complete search history.

(56) References Cited

U.S. PATENT DOCUMENTS

| | | | |
|---|---|---|---|
| 5,144,448 | A | 9/1992 | Hornbaker, III et al. |
| 5,414,534 | A | 5/1995 | Bindon |
| 5,663,806 | A | 9/1997 | Grise et al. |
| 6,177,217 | B1 | 1/2001 | Agostinelli et al. |
| 6,734,998 | B2 | 5/2004 | Tsai et al. |
| 7,265,881 | B2 | 9/2007 | Harris et al. |

*Primary Examiner* — Benny Q Tieu
*Assistant Examiner* — Marcellus Augustin
(74) *Attorney, Agent, or Firm* — Pierce Atwood LLP; Joseph M. Maraia

(57) ABSTRACT

In certain embodiments, compensating for misalignment comprises receiving, at a detector array, electromagnetic (E-M) radiation from a target object. The detector array comprises time delay and integration (TDI) detectors organized into segments. Each segment comprises one or more rows of detectors perpendicular to a designed scan axis, and comprises columns of detectors parallel to the designed scan axis. The detector array moves in a relative scan direction relative to the target object. The following is performed for each segment and for each column of each segment. If there is misalignment at a segment, a signal is passed to a correcting next column of a next segment in the direction of the misalignment, where the signal accumulates scan data of a portion of the target object. Otherwise, the signal is passed to a designed next column of the next segment in the direction of the designed scan axis.

20 Claims, 4 Drawing Sheets

US 8,300,276 B2

COMPENSATING FOR MISALIGNMENT IN AN IMAGE SCANNER

TECHNICAL FIELD

This invention relates generally to the field of image collection and more specifically to compensating for misalignment in an image scanner.

BACKGROUND

A time delay and integration (TDI) image scanner accumulates multiple exposures of the same object as the object moves relative to the scanner. The scanner effectively increases the integration time for collecting incident light. Typically, the object's motion should be aligned with most or all of the exposures.

SUMMARY OF THE DISCLOSURE

In accordance with the present invention, disadvantages and problems associated with previous techniques for scanning objects may be reduced or eliminated.

In certain embodiments, compensating for misalignment comprises receiving, at a detector array, electromagnetic (E-M) radiation from a target object. The detector array comprises time delay and integration (TDI) detectors organized into segments. Each segment comprises one or more rows of detectors perpendicular to a designed scan axis, and comprises columns of detectors parallel to the designed scan axis. The detector array moves in a relative scan direction relative to the target object. The following is performed for each segment and for each column of each segment. If there is misalignment at a segment, a signal is passed to a correcting next column of a next segment in the direction of the path of misalignment, where the signal accumulates scan data of a portion of the target object. Otherwise, the signal is passed to a designed next column (for example, passed to a detector of the column) of the next segment in the direction of the designed scan axis.

Certain embodiments of the invention may provide one or more technical advantages. A technical advantage of one embodiment may be that a signal may be passed among segments in a manner that compensate for image misalignment as a target object (such as a document) is being scanned. Another technical advantage of one embodiment may be that compensating for the misalignment may yield a resulting image that better matches the target object.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
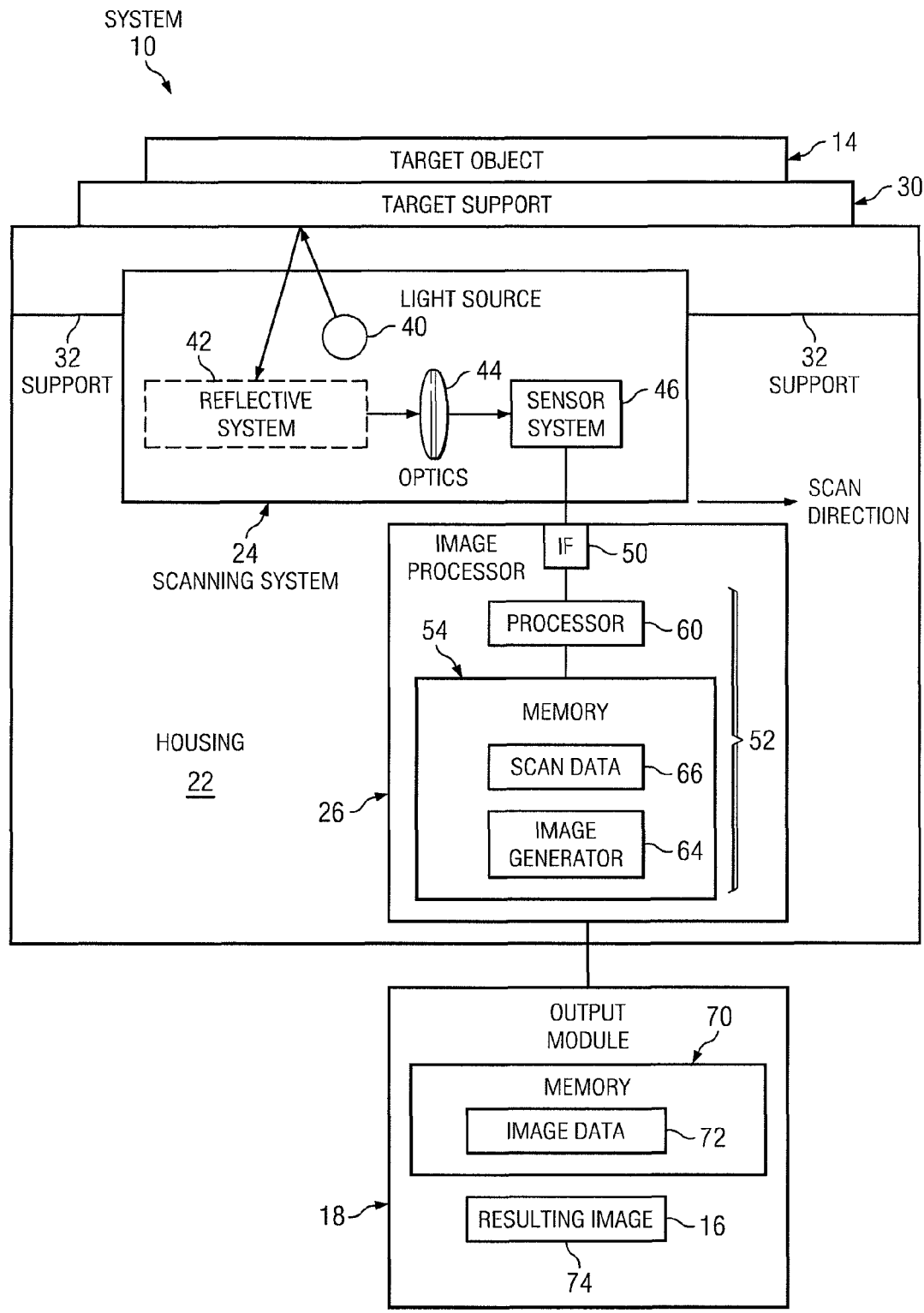
FIG. 1 illustrates an example of a system that may be used to correct misalignment.

FIG. 1 illustrates an example of a system 10 (such as an image scanner) that may be used to correct misalignment. In certain embodiments, system 10 collects scan data of a target object 14 in order to generate a resulting image 16 that corresponds to (or looks like) target object 14. In certain embodiments, system 10 may correct misalignment between a designed scan axis of a scanning system and the actual motion of the scanning system relative to the object or scene being scanned.

In the illustrated embodiment, system 10 includes a housing 22, a scanning system 24, and an image processor 26. Housing 22 includes a target support 30 and one or more other supports 32. Scanning system 24 includes a light source 40, a reflective system 42, optics 44, and a sensor system 46. Image processor 26 includes an interface (IF) 50, logic 52, and a memory 54. Logic includes a processor 60 and applications such as an image generator 64 stored at memory 54. Memory 54 also stores scan data 66. Output module 18 includes a memory 70 that stores image data 72. Output module 18 displays resulting image 74. Of course, system 10 may include more, fewer, or different components. For example, light source 40 may be omitted if target object 14 emits its own E-M radiation and does not need to reflect radiation from another source to create image 16.

In certain embodiments, a target object 14 may be any suitable two- or three-dimensional physical entity that reflects and/or emits E-M radiation from which resulting image 74 may be generated. Examples of E-M radiation include ultraviolet, visible, infrared, and any other energy in the E-M spectra that can be used to create image 16. Examples of target objects 14 include documents, photographs, drawings, models, landscapes, scenes, and living beings. In certain situations, target object 14 may have a non-flat shape, such as a curved shape (for example, a hill) or spherical shape (for example, a planet), that has a non-flat image field. A target may be a region of target object 14 that sensor system 46 can readily detect, such as a darker or lighter area, for example, a spot of target object 14.

In certain embodiments, housing 22 of system 10 houses and/or provides support for scanning system 24 and image processor 26. For example, supports 32 may be used to support scanning system 24 and/or move scanning system 24 relative to target object 14. Scanning system 24 may move relative to target object 14 in any suitable manner. In certain embodiments, scanning system 24 may move while target object 14 remains stationary, such as when an image scanner scans a document. In other embodiments, target object 14 may move while remains scanning system 24 stationary, such as when a surveillance camera detects a moving object. In yet other embodiments, both scanning system 24 and target object 14 may move, such as when a satellite scans a planet. The direction that scanning system 24 moves relative to target object is the relative scan direction. Target support 30 supports target object 14 and may comprise a transparent planar structure (for example, a glass plate) onto which target object 14 may be placed.

In certain embodiments, scanning system 24 collects scan data generated in response to detecting one or more target objects 14. In the embodiments, scanning system moves relative to target object 14. As scanning system 24 moves across portions of target object 14, scanning system 24 accumulates one or more exposures of the same portion of target object 14. For example, scanning system 24 may have multiple detectors that detect a target of target object 14 to accumulate multiple exposures of the target.

In certain embodiments, light source 40 of scanning system 24 directs E-M radiation towards target object 14, which reflects the radiation. Examples of light source 40 include light-emitting diode (LED) light sources. In other embodiments, target object 14 emits radiation and light source 40 may be omitted. Reflective system 42 receives radiation from target object 14, for example, E-M radiation emitted and/or reflected from target object 14. Reflective system 42 directs the radiation towards optics 44, and may comprise a series of reflective surfaces (such as mirrors). Optics 44 directs and focuses the radiation towards sensor system 46.

In certain embodiments, sensor system 46 detects the radiation and generates signals in response to the radiation. In certain embodiments, sensor system 46 comprises an array of detectors. An example of an array is described in more detail with reference to FIGS. 2 through 4.

Figure 2:
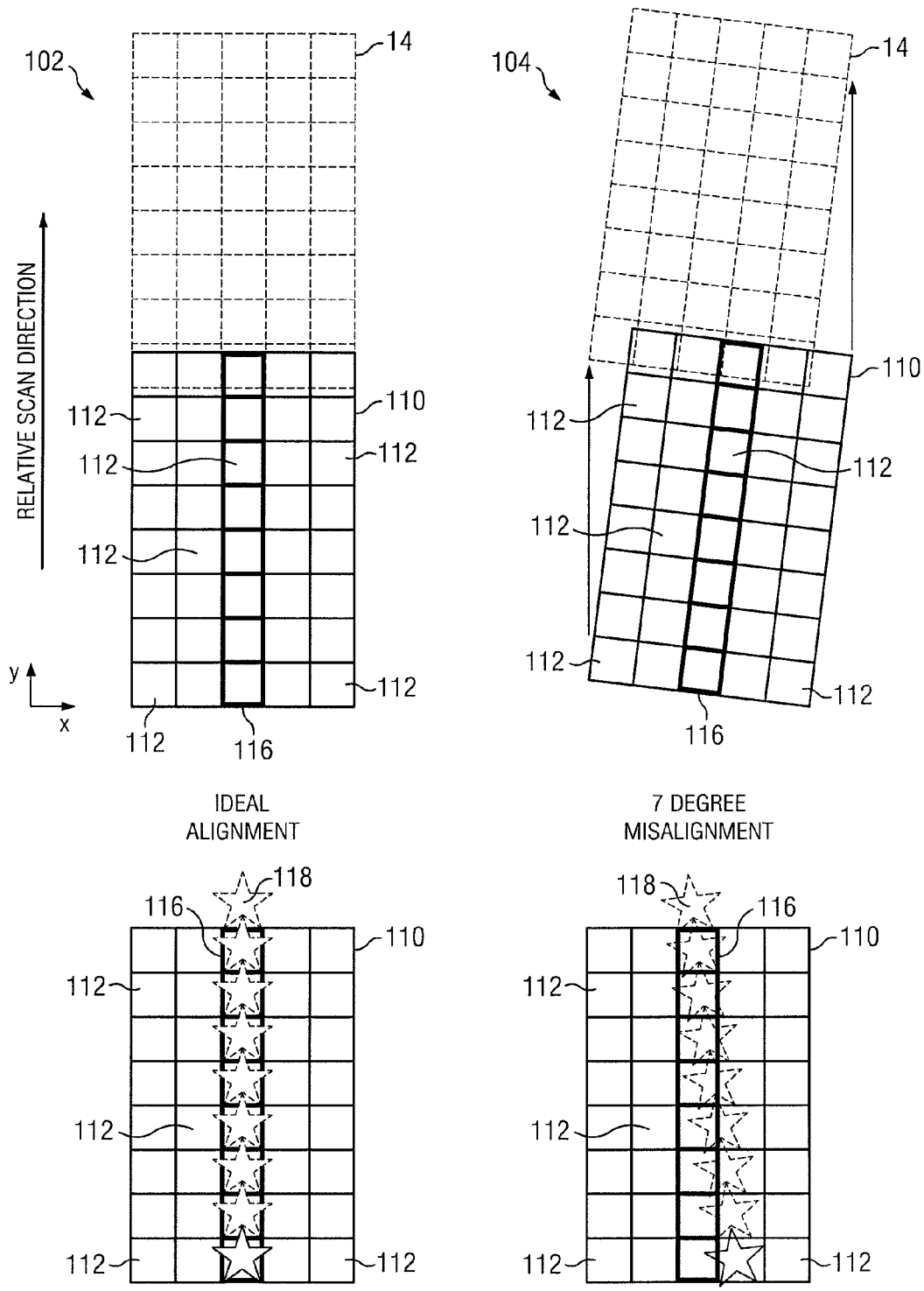
FIG. 2 illustrates an example of a detector array that may be used with the system of FIG. 1.

FIG. 2 illustrates an example of a detector array 110 that may be used with system 10 of FIG. 1. In certain embodiments, detector array 110 comprises any suitable detectors 112, such as time delay and integration (TDI) detectors that can detect E-M radiation. The detectors may be arranged in rows and columns that define an x-axis and a y-axis, respectively. An axis, such as the y-axis, may define a designed scan axis.

Diagram 102 illustrates an ideal alignment between detector array 110 and the relative scan direction. In certain embodiments, a column 116 of detectors 112 may detect a particular portion (such as a target 118) of target object 14 multiple times in order to obtain multiple exposures of the portion. In an ideal alignment, scanning system 24 moves relative to the portion such that column 116 scans the portion, that is, the relative scan direction is parallel to the designed scan axis.

In an example, a first detector 112 of column 116 detects target 118 and generates a signal in response to the detection and passes the signal to a next detector 112. As each detector 112 of column 116 detects target 118, the detector 112 adds to the signal and passes the signal to a next detector 112 until a last detector 112 is reached. Thus, in an ideal alignment, a column 116 generates a signal that accumulates scan data for a particular portion of target object 14.

Diagram 104 illustrates a misalignment between movement of detector array 110 and the relative scan direction. In practical situations, the relative scan direction might not be parallel to the designed scan axis. One or more detectors 112 of column 116 may fail to detect target 118. Instead, one or more detectors 112 of a column 116 adjacent to column 116 detects target 118. In other words, target 16 moves from one column 116 to an adjacent column 116. In an n-degree misalignment, target 118 from column 116 to an adjacent column after n rows. This misalignment may yield a smear in resulting image 16.

Misalignment may result from a number of situations. For example, a failure in the production or use of system 10 might cause system 10 to fail to move scanning system 24 in a relative scan direction that is parallel to the designed scan axis. As another example, scanning system 24 may use optics that distort radiation from target object 14 such that relative scan direction fails to be parallel to the designed scan axis. As another example, target object 14 may have a shape (such as a non-flat shape) that scanning system 24 cannot scan in a relative scan direction that is constantly parallel to the designed scan axis.

The misalignment present in a particular system 10 may be determined in any suitable manner. For example, misalignment may be determined during calibration of system 10. Sensor system 46 may then be configured to compensate for the misalignment. As another example, misalignment may be determined dynamically while system is in use. A feedback system may detect the appearance of or changes in misalignment while system 10 is in use. A feedback system may notify sensor system 46 of the misalignment, which may then compensate for the misalignment.

Figure 3:
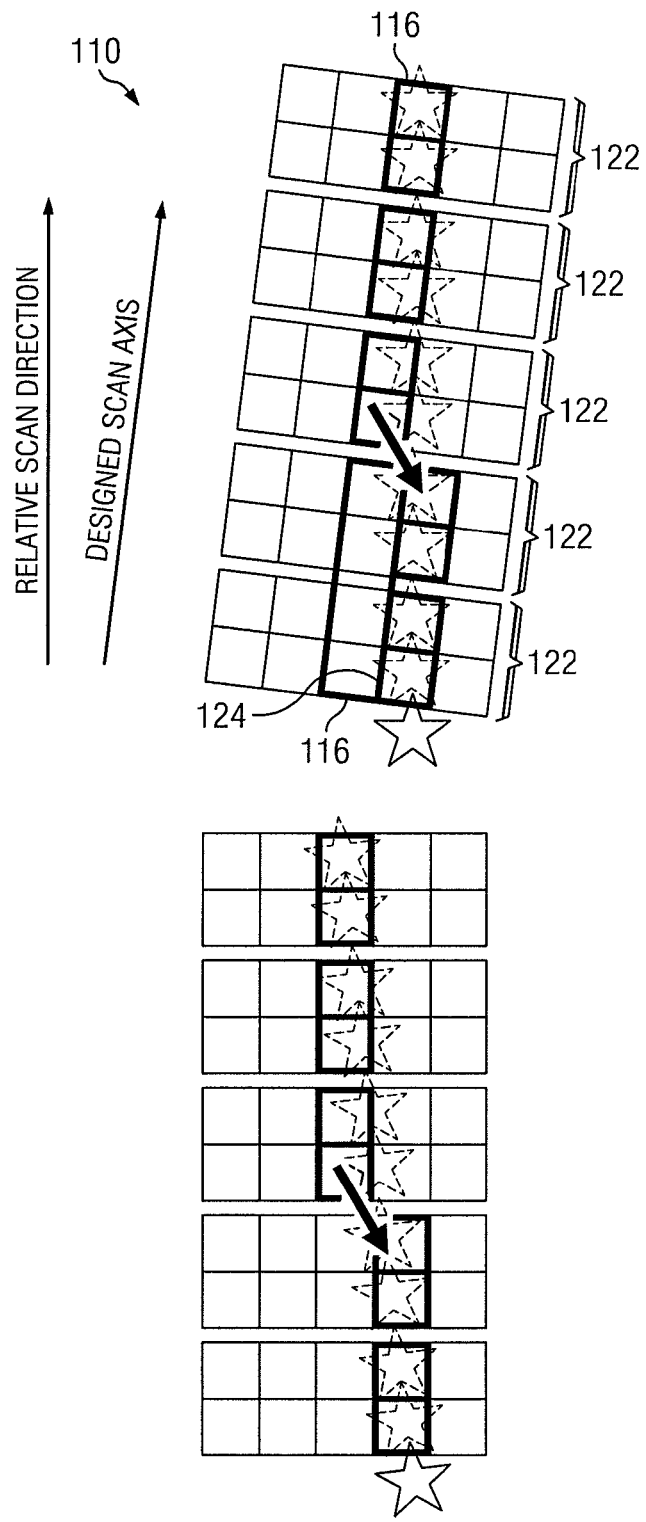
FIG. 3 illustrates the detector array of FIG. 2 that may compensate for misalignment.

FIG. 3 illustrates detector array 110 of FIG. 2 that may compensate for misalignment. In certain embodiments, detectors 112 of detector array 110 may be organized into a plurality of segments 122. A segment 122 comprises one, two, or more rows of detectors 112 perpendicular to the designed scan axis, and one or more columns of detectors 112 parallel to the designed scan axis. In the example, a set of columns 116 forming a line parallel to the designed scan axis may be designed to detect a particular target 118 such that a column 116 of one segment 122 may have a designed next column 116 in the direction of the designed scan axis. A column 116 may be said to detect a target 118 if one, more than one, or all detectors of column 116 detect target 118.

In certain embodiments, segments 122 may operate to compensate for misalignment. In the embodiments, columns 116 of a segment 122 may compensate for misalignment of the relative scan direction and the designed scan axis. The misalignment may cause target 118 to move more than threshold value relative to column 116. The threshold value may be expressed in distance or in pixels corresponding to detectors 112. For example, the threshold value may be half a pixel.

If there is misalignment, column 116 may pass the signal to a correcting next column 124 of a next segment in the direction of the misalignment. Correcting next column 124 may be a column that can better detect target 118 than a designed next column 116, and may be adjacent to designed next column 116. For example, target 118 may move to the right (or left) of current column 116, so column 116 may pass the signal to correcting next column 124 that is to the right (or left) of designed next column 116. If there is no misalignment, column 116 may pass the signal to designed next column 116 of the next segment 122 in the direction of the designed scan axis. Accordingly, the signal accumulates scan data for a particular portion of target object 14.

Any suitable device, such as one or more processors, may perform the compensation operation. Examples of processors imaging integrated circuit, a device between TDI detector groups, or an off-imager processor. The one or more processors may be integrated with or separate from sensors system 46 and/or scanning system 24. The one or more processors may be analog and/or digital, and may be embodied in circuitry connected to a detector of sensor system 46.

Figure 4:
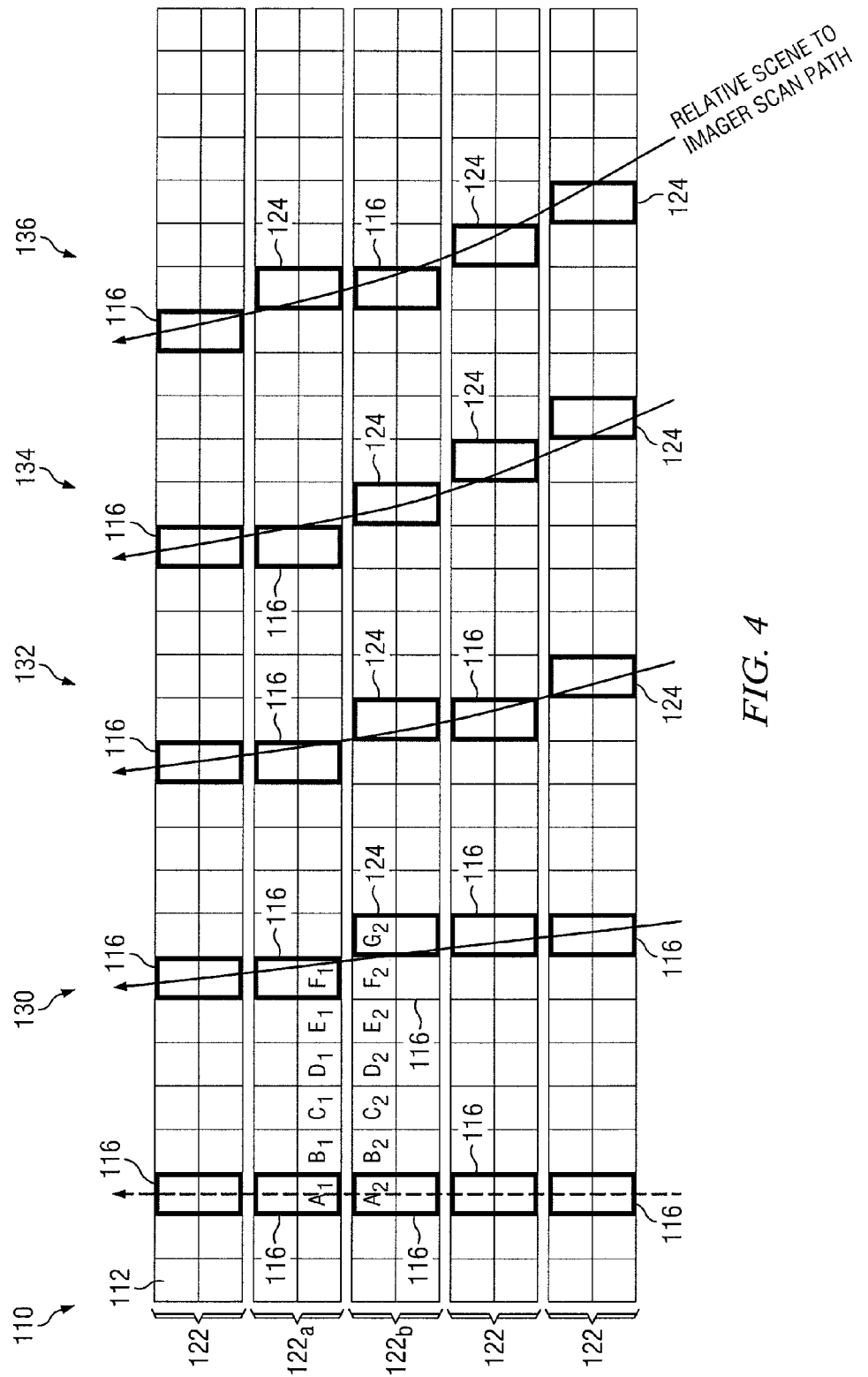
FIG. 4 illustrates an example of a detector array that compensates for different misalignments across the array.

FIG. 4 illustrates an example of a detector array 110 that compensates for different misalignments across the array. Detector array 110 may compensate for a variety of different misalignments. The misalignments may result from linear relative motion between target 118 and scanning system 24 (shown in portion 130) or from nonlinear relative motion (shown in portions 132, 134, and 136).

In certain embodiments, detector array 110 may be able to address situations in which columns 116 of a current segment 122 pass signals to columns 116 of a next segment 122, but the number of columns of current segment 122 is not equal to the number of columns 116 of next segment 122. In certain situations, the number of columns of current segment 122 is less than the number of columns 116 of next segment 122. For example, in the illustrated embodiment, detectors $A_1, B_1, C_1, D_1, E_1$, and $F_1$ pass signals to detectors $A_2, B_2, C_2, D_2, E_2, F_2$, and $G_2$. Detector array 110 may address this situation in any suitable manner. For example, one column 116 of current segment 122 may pass a signal to more than one column 116 of next segment 122. For example, column $F_1$ may pass its signal to columns $F_2$ and $G_2$.

In certain situations, the number of columns of current segment 122 is greater than the number of columns 116 of next segment 122. For example, detectors $A_1, B_1, C_1, D_1, E_1$, and $F_1$ (not illustrated) may pass signals to only detectors $A_2, B_2, C_2, D_2$, and $E_2$ (not illustrated). Detector array 110 may address this situation in any suitable manner. For example, more than one column 116 of current segment 122 may pass signals to one column 116 of next segment 122. For example, detectors $E_1$ and $F_1$ may pass their signal to detector $E_2$. Detector $E_2$ may select a signal to use or may integrate the signals (for example, average the signals) to use both. As another example, a detector 112 of current segment 122 may refrain from passing its signal to any column 116 of next segment 122. For example, detector $E_1$ may refrain from passing its signal.

Returning to FIG. 1, in certain embodiments, image processor 29 of system 10 receives one or more signals from scanning system 24, obtains scan data from the signals, and processes the scan data to yield image data that may be used to generate resulting image 24.

In certain embodiments, a signal may track a particular portion of target object 14, such as a target 118. Accordingly, image processor 29 may use the scan data from the signal to generate image data for a particular portion of resulting image 16 that corresponds to the particular portion of target object 14. For example, a particular xy coordinate of a target object 14, such as a document, may correspond to the particular xy coordinate of resulting image 16 that is supposed to look like the document. The image data for the portions of resulting image 16 may be combined to yield resulting image 16. In certain embodiments, output module 18 receives image data from image processor 26. Output module 18 generates and displays resulting image 74 using the image data.

A component of the systems and apparatuses disclosed herein may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as an analog and/or digital processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program. In particular embodiments, the operations of the embodiments may be performed by sensor system 46 and/or processors.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of scanning system 24 and image processor 26 may be performed by one component, or the operations of scanning system 24 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus comprising:
   a detector array configured to receive electromagnetic (E-M) radiation from a target object, the detector array comprising a plurality of time delay and integration (TDI) detectors, the detectors organized into a plurality of segments, each segment comprising one or more rows of the detectors perpendicular to a designed scan axis, each segment comprising a plurality of columns of the detectors parallel to the designed scan axis, the detector array moving in a relative scan direction relative to the target object; and
   one or more processors configured to perform the following for each segment of the detector array:
      perform the following for each column of the each segment to yield a plurality of signals, the each column detecting a portion of the target object:
         if there is misalignment at the each segment, pass a signal to a correcting next column of a next segment in the direction of the misalignment, the signal accumulating scan data of the portion of the target object; and
         otherwise, pass the signal to a designed next column of the next segment in the direction of the designed scan axis.

2. The apparatus of claim 1, the one or more processors configured to perform the following for each signal to yield a plurality of portions of a resulting image:

obtain the scan data from the each signal, the each signal accumulating scan data of a portion of the target object; and generate image data from the scan data for a portion of the resulting image that corresponds to the portion of the target object.

3. The apparatus of claim 1, there is misalignment at the each segment if a target of the target object has moved a more than half a pixel relative to the each column.

4. The apparatus of claim 1, the one or more processors configured to pass a signal to a correcting next column by:

passing the signal to the correcting next column in the direction that a target of the target object has moved relative to the column.

5. The apparatus of claim 1, the one or more processors configured to perform the following for each segment of the detector array:

if:

one or more columns of a current segment are to pass one or more signals to a plurality of correcting next columns of a next segment; and the number of columns of the current segment is less than the number of correcting next columns of the next segment, then pass a signal to more than one correcting next column.

6. The apparatus of claim 1, the one or more processors configured to perform the following for each segment of the detector array:

if:

one or more columns of a current segment are to pass one or more signals to a plurality of correcting next columns of a next segment; and the number of columns of the current segment is greater than the number of correcting next columns of the next segment, then pass at least two signals to a correcting next column, the correcting next column configured to integrate the signals.

7. The apparatus of claim 1, each segment comprising two or more rows of the detectors.

8. A method comprising:

receiving, at a detector array, electromagnetic (E-M) radiation from a target object, the detector array comprising a plurality of time delay and integration (TDI) detectors, the detectors organized into a plurality of segments, each segment comprising one or more rows of the detectors perpendicular to a designed scan axis, each segment comprising a plurality of columns of the detectors parallel to the designed scan axis, the detector array moving in a relative scan direction relative to the target object;

performing the following for each segment of the detector array:

performing the following for each column of the each segment to yield a plurality of signals, the each column detecting a portion of the target object:

if there is misalignment at the each segment, passing a signal to a correcting next column of a next segment in the direction of the misalignment, the signal accumulating scan data of the portion of the target object; and otherwise, passing the signal to a designed next column of the next segment in the direction of the designed scan axis.

9. The method of claim 8, further comprising performing the following for each signal to yield a plurality of portions of a resulting image:

obtaining the scan data from the each signal, the each signal accumulating scan data of a portion of the target object; and generating image data from the scan data for a portion of the resulting image that corresponds to the portion of the target object.

10. The method of claim 8, there is misalignment at the each segment if a target of the target object has moved a more than half a pixel relative to the each column.

11. The method of claim 8, the passing a signal to a correcting next column further comprising:

passing the signal to the correcting next column in the direction that a target of the target object has moved relative to the column.

12. The method of claim 8, the performing the following for each segment of the detector array further comprising:

if:

one or more columns of a current segment are to pass one or more signals to a plurality of correcting next columns of a next segment; and the number of columns of the current segment is less than the number of correcting next columns of the next segment, then passing a signal to more than one correcting next column.

13. The method of claim 8, the performing the following for each segment of the detector array further comprising:

if:

one or more columns of a current segment are to pass one or more signals to a plurality of correcting next columns of a next segment; and the number of columns of the current segment is greater than the number of correcting next columns of the next segment, then passing at least two signals to a correcting next column, the correcting next column configured to integrate the signals.

14. The method of claim 8, each segment comprising two or more rows of the detectors.

15. An apparatus comprising:

a detector array configured to receive electromagnetic (E-M) radiation from a target object, the detector array comprising a plurality of time delay and integration (TDI) detectors, the detectors organized into a plurality of segments, each segment comprising a plurality of rows of the detectors perpendicular to a designed scan axis, each segment comprising a plurality of columns of the detectors parallel to the designed scan axis, the detector array moving in a relative scan direction relative to the target object; and one or more processors configured to perform the following for each segment of the detector array:

perform the following for each column of the each segment to yield a plurality of signals, the each column detecting a portion of the target object:

if there is misalignment at the each segment, pass a signal to a correcting next column of a next segment in the direction of the misalignment, the signal accumulating scan data of the portion of the target object; and otherwise, pass the signal to a designed next column of the next segment in the direction of the designed scan axis; and perform the following for each signal to yield a plurality of portions of a resulting image:
obtain the scan data from the each signal, the each signal accumulating scan data of a portion of the target object; and
generate image data from the scan data for a portion of the resulting image that corresponds to the portion of the target object.

16. The apparatus of claim 15, further comprising an output module configured to display the resulting image generated from the image data.

17. The apparatus of claim 15, there is misalignment at the each segment if a target of the target object has moved a more than half a pixel relative to the each column.

18. The apparatus of claim 15, the one or more processors configured to pass a signal to a correcting next column by:
passing the signal to the correcting next column in the direction that a target of the target object has moved relative to the column.

19. The apparatus of claim 15, the one or more processors configured to perform the following for each segment of the detector array:
if:
one or more columns of a current segment are to pass one or more signals to a plurality of correcting next columns of a next segment; and
the number of columns of the current segment is less than the number of correcting next columns of the next segment,
then pass a signal to more than one correcting next column.

20. The apparatus of claim 15, the one or more processors configured to perform the following for each segment of the detector array:
if:
one or more columns of a current segment are to pass one or more signals to a plurality of correcting next columns of a next segment; and
the number of columns of the current segment is greater than the number of correcting next columns of the next segment,
then pass at least two signals to a correcting next column, the correcting next column configured to integrate the signals.

* * * * *